United States Patent
Jones

[19]

[11] Patent Number: 5,988,967
[45] Date of Patent: Nov. 23, 1999

[54] HORSESHOE NAIL AND HORSESHOE NAIL FORMING PROCESS

[75] Inventor: Jeffrey Dudley Jones, Victoria, Australia

[73] Assignee: Ajax Cooke Pty. Ltd., Melbourne, Australia

[21] Appl. No.: 08/973,304

[22] PCT Filed: Jun. 21, 1996

[86] PCT No.: PCT/AU96/00378

§ 371 Date: Nov. 26, 1997

§ 102(e) Date: Nov. 26, 1997

[87] PCT Pub. No.: WO97/00606

PCT Pub. Date: Jan. 9, 1997

[30] Foreign Application Priority Data

Jun. 22, 1995 [AU] Australia ................................ PN3708
Oct. 27, 1995 [AU] Australia ................................ PN6213
Oct. 27, 1995 [AU] Australia ................................ PN6214

[51] Int. Cl.⁶ ...................................................... F16B 15/00
[52] U.S. Cl. .......................... 411/489; 470/35; 470/111; 411/487
[58] Field of Search ................................. 411/488, 489, 411/493, 499, 487; 470/35–37, 111–115; 168/23

[56] References Cited

U.S. PATENT DOCUMENTS

| | | | |
|---|---|---|---|
| 333,396 | 12/1885 | Coleman | 411/488 |
| 378,935 | 3/1888 | Muterspaugh | 411/489 |
| 397,896 | 2/1889 | Coleman | 411/489 |
| 417,490 | 12/1889 | Kempster | 411/489 |
| 579,869 | 3/1897 | Hanson | 470/112 |
| 639,405 | 12/1899 | Knight | 411/499 |
| 1,006,585 | 10/1911 | Moller | 411/489 |
| 1,276,544 | 8/1918 | Knight | 411/489 |
| 1,324,795 | 12/1919 | Capewell | 411/489 |
| 1,443,527 | 1/1923 | Cutter | 470/35 |
| 4,748,708 | 6/1988 | Schlicht . | |

FOREIGN PATENT DOCUMENTS

| | | |
|---|---|---|
| 0 143 579 A1 | 6/1985 | European Pat. Off. . |
| 0 638 378 A1 | 2/1995 | European Pat. Off. . |
| 3272 | 5/1878 | Germany . |
| 362872 | 11/1922 | Germany . |
| 16261 | 8/1912 | United Kingdom . |
| 16496 | 12/1916 | United Kingdom . |

OTHER PUBLICATIONS

Patent Abstracts of Japan, vol. 012, No. 434 (M–764), Nov. 16, 1988 & JP 63 168244 A (Shinjiyou Seisakusho:KK; Others: 02), Jul. 12, 1988.

*Primary Examiner*—Flemming Saether
*Attorney, Agent, or Firm*—Sterne, Kessler, Goldstein & Fox P.L.L.C.

[57] ABSTRACT

A nail for fixing a shoe to a hoof includes a head, and a shank extending from the head generally along a centerline and terminating in a tip. A reaction region is formed in the shank adjacent the tip and has a flattened profile having front and rear surfaces interconnected by respective edge surfaces. In the reaction region the front surface is convexly curved to incline the front surface relative to the centreline of tho shark The edge surfaces converge relative to each other towards the tip, whereby, on forcing the nail into the hoof, the reaction region is adapted to produce a resultant force on the nail. The resultant force is caused by engagement of the reaction with the hoof. The resultant force is adapted to predispose the nail to bend about the rear surface of the reaction region Also disclosed are processes for forming a horseshoe nail.

21 Claims, 6 Drawing Sheets

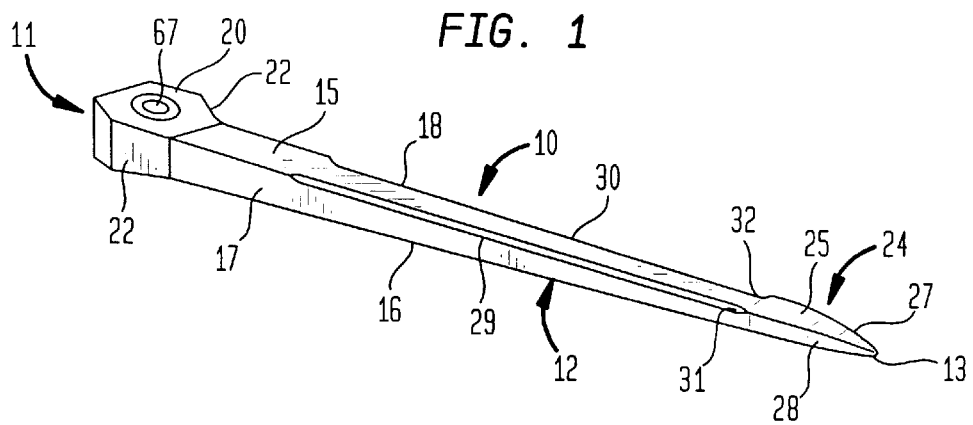
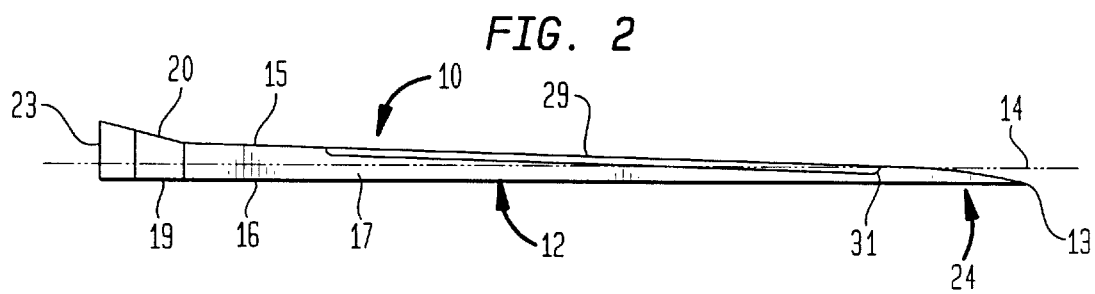
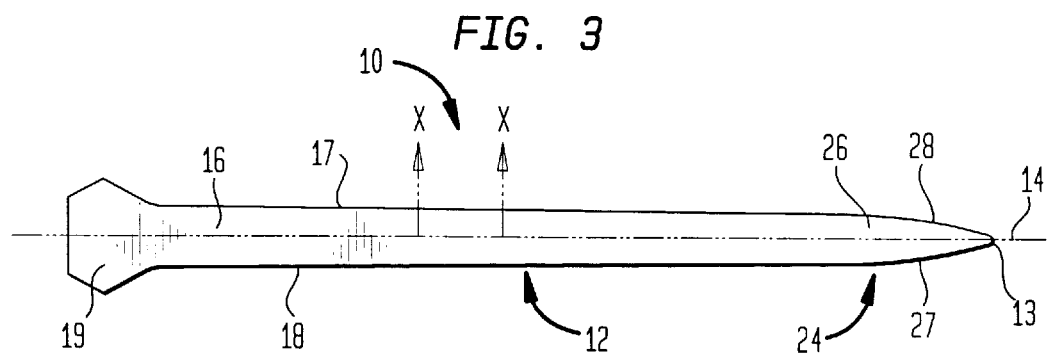
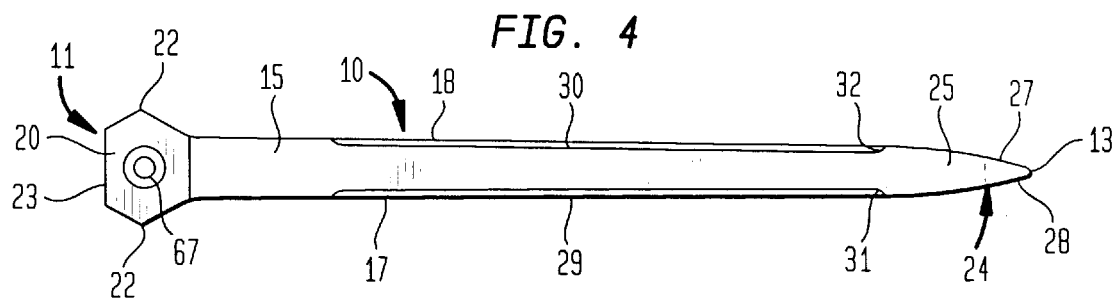

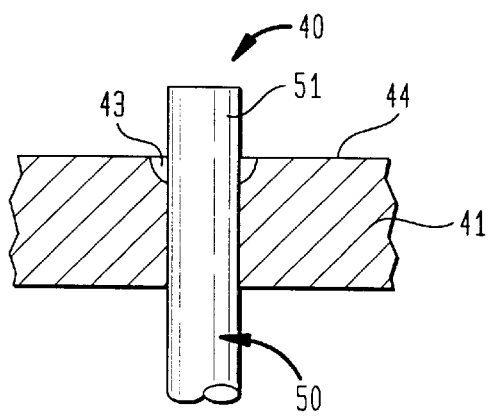
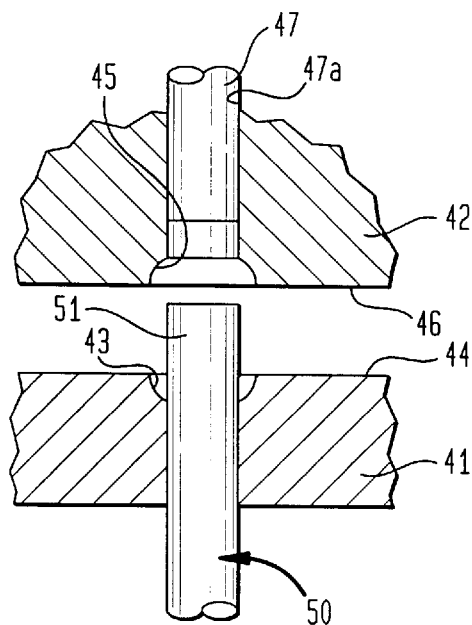
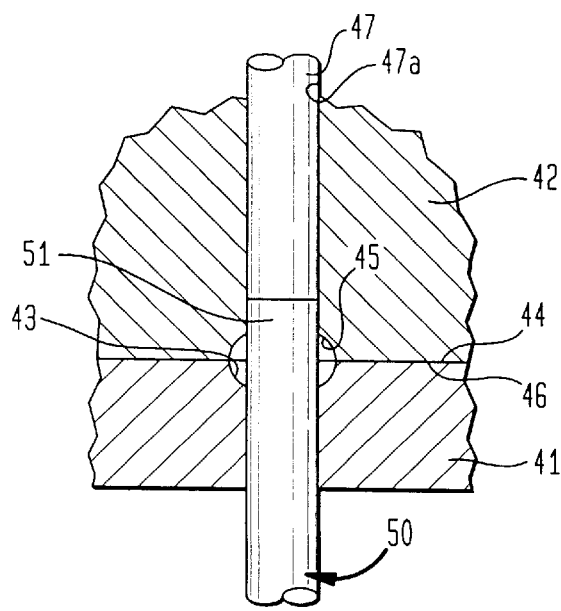
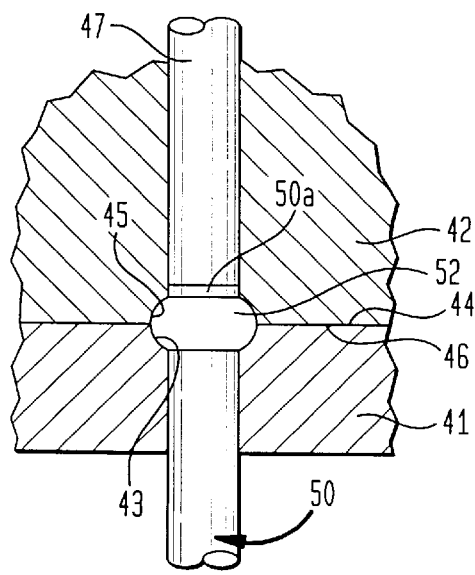

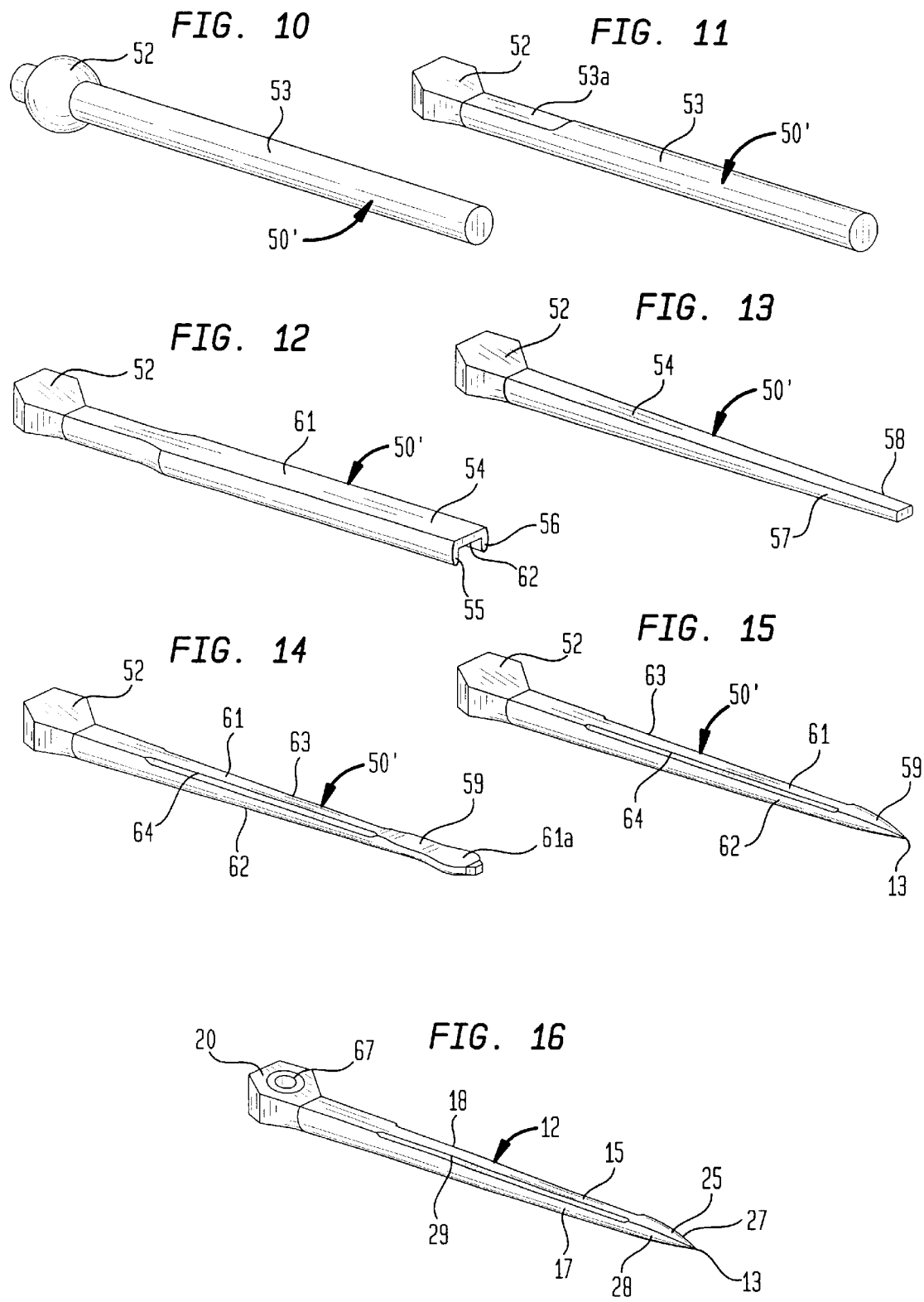

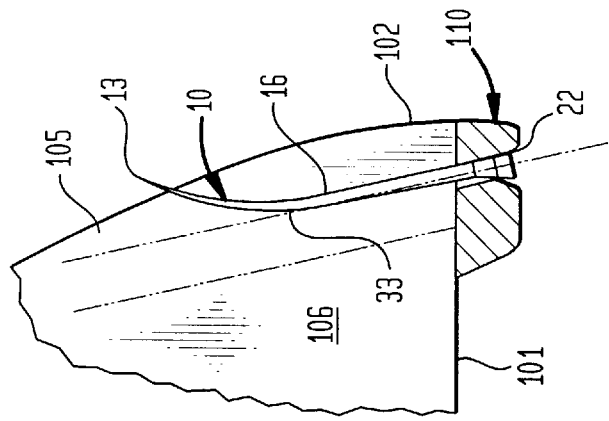
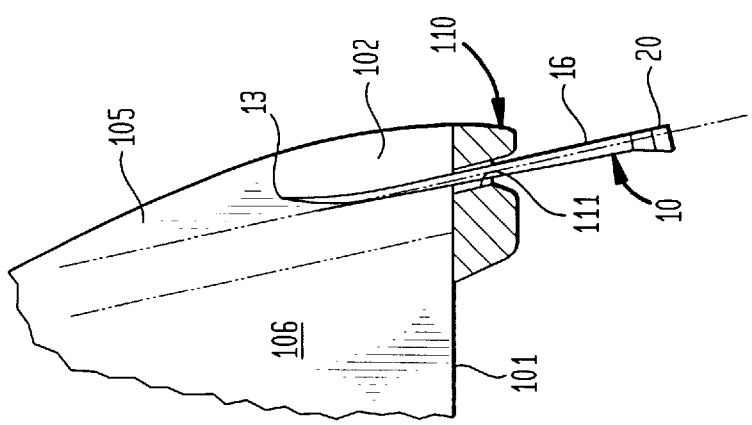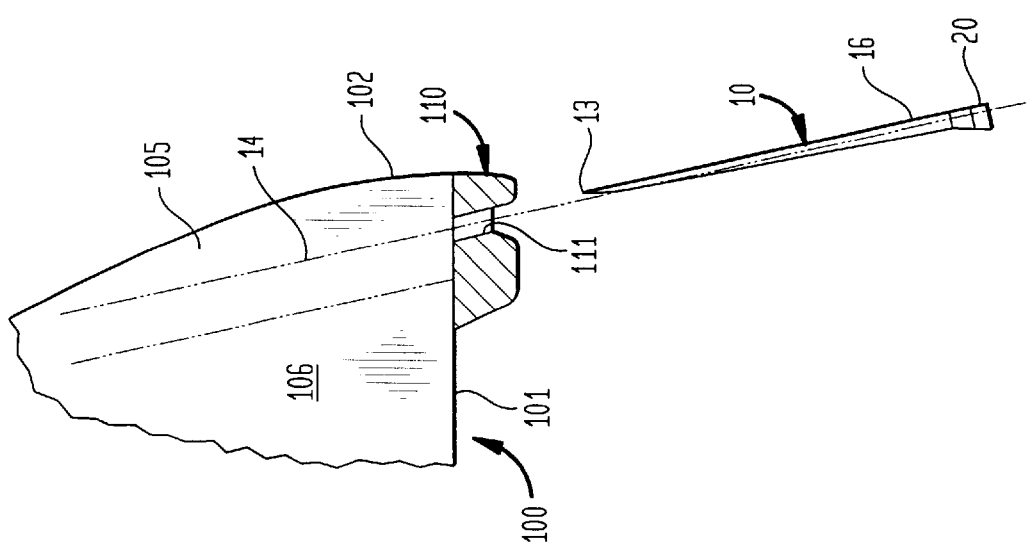

HORSESHOE NAIL AND HORSESHOE NAIL FORMING PROCESS

FIELD OF THE INVENTION

The present invention relates generally to nails of the kind useful for fixing a shoe to a hoof, and to methods for forming such nails. Nails of this kind are referred to herein as horseshoe nails.

BACKGROUND ART

Horseshoe nails are specifically designed to bend as they are driven into a hoof. Typically a farrier drives the horseshoe nail into the bottom of the hoof through a slot in the shoe and as the nail is driven into the hoof, it bends so that the tip is caused to pass out the side of the hoof. Once in this position, the farrier removes the tip of the nail, either by cutting or ringing it off, and drives the remaining shank downwards against the hoof. This secures the nail, and therefore the shoe, in place.

A typical horseshoe nail includes a shank of generally rectangular cross section, and a head located at one end of the shank. The shank has a front and a rear surface interconnected by opposing edge surfaces, the edge surfaces being flat and nearly parallel but slightly tapered along a major part of the shank. In the end quarter of the shank remote from the head the edge surfaces converge together to form the tip. The rear surface of the shank is substantially flat, whereas the front surface of the shank is also flat along the major part of the shank except adjacent the tip where the front surface is angled to converge towards the rear surface at the tip. This angled portion is designed to cause the nail to bend as it is driven into the hoof.

It is desirable that the nail exit the hoof at a particular distance from the shoe. A well shot horse will have a ring of horseshoe nails spaced around the hoof all exiting the hoof at approximately the same distance from the bottom of the hoof. If a nail bends too sharply, it can fracture off an edge of the hoof. If a nail does not bend sufficiently or bends the wrong way, it cannot be secured in place and, moreover, can lame the horse.

In analysing the way a horseshoe nail bends when it is being driven into a hoof, it is considered that whilst the loading to cause bending is initially induced on the angled portion or reaction region adjacent the tip, as the nail beings to bend this loading is transferred along the shank towards the head. As a result, the part of the shank which extends from the angled portion towards the head is the main part of the nail which bends and throughout the specification, reference to the "bending region" of the nail refers to this part of the shank.

Horseshoe nails have generally been formed from a slug of metal cut from wire or rod of a gauge similar to the intended mean diameter of the nail head. This slug is drawn or rolled out, typically by air hammers, to form the head and to reduce its cross-section while forming the characteristic rectangular shank profile. To reduce work hardening, the nail undergoes one or two annealing treatments during or following shaping. Once fully shaped, the shank is then sheared to form the tip.

A problem with previous horseshoe nails is that they do not bend in a consistent manner. A broad reason is a lack of uniformity in the structure and bending properties of the nails, despite a seemingly uniform method of formation. One common cause of non-uniformity is the presence of flaws formed in the nails during their manufacture. These flaws are a consequence of the complexity in the nail forming operation and are often present as surface defects, such as dimples, or inconsistencies within the microstructure of the nail. As a result of the flaws, the nails will often have a weakened area which may cause the nail to bend the wrong way, or, in the case of flaws occurring in the microstructure, the nails may have an area of increased hardness in the nail shank which may cause the nail to drive straight or not bend sufficiently. Surface defects can have marked effects on the bending performance of the nail particularly when they are located in the tip or reaction region, whereas flaws in the microstructure cause particular problems when they occur in the bending region of the shank.

While a farrier is able to detect surface defects on a visual inspection of the nail, it is not practical for the farrier to examine the nail to determine if there are flaws in the microstructure. Typically the only way the farrier detects these flaws in the microstructure is by the feel of the nail, in particular as the nail is being driven into the hoof and this usually can only be done by experience farriers.

Another known cause of inconsistent bending is the presence of a region of increased resistance within the hoof which causes the nail to be deflected from its optimal path.

SUMMARY OF THE INVENTION—NAIL ASPECTS

An aim of the present invention is to provide an improved nail which is suitable for fixing a shoe to a hoof and an improved method of forming the nail. A particular aim of the invention is to provide a horseshoe nail which is able to bend more consistently.

In first and second aspects, the present invention provides a nail for fixing a shoe to a hoof, the nail including a head, and a shank extending from the head generally along a centreline and terminating in a tip. A reaction region is formed in the shank adjacent the tip, and has a flattened profile having front and rear surfaces interconnected by respective edge surfaces.

In the first aspect of the invention, in the reaction region, the front surface is convexly curved to incline the front surface relative to the centreline of the shank, and the edge surfaces converge relative to each other towards the tip, whereby, on forcing the nail into the hoof, the reaction region is adapted to produce a resultant force on the nail caused by engagement of the reaction region with the hoof, the resultant force being adapted to predispose the nail to bend about the rear surface of the reaction region.

In the second aspect of the invention, which may be alternative to or additional to the first aspect, the edge surfaces are convexly curved towards the tip in the reaction region so as to converge towards the tip, and the front surface in the reaction region is inclined relative to the centreline of the shank. In prior art nails, the edge surfaces are typically straight or flat as they converge to the tip in the reaction region.

The advantage of convexly curved edge surfaces is that the tip is better supported than the prior art nails while still enabling the nail to be predisposed to bend in a direction about the rear surface. As a result of the tip being better supported, it is less likely to be damaged by an impacting force being applied to the tip. Therefore it is less likely that flaws, such as dimples, are formed in the nail during its manufacture which could otherwise cause the nail to bend incorrectly in use. Furthermore, with the tip being better supported, the nail is less likely to deviate from its path on striking a region of increased resistance within the hoof.

A further advantage of having the edge surfaces of the reaction region convexly curved, is that the area of the front surface is increased as compared to a straight edge surface. As the magnitude of the resultant force produced by the reaction region is proportional to the size of the front surface, this increases the resultant force produced on the nail.

Preferably, the reaction region merges with the remaining part of the shank such that the flattened profile extends towards the head. In this way, at least the majority of the shank has front and rear surfaces which are interconnected by the edge surfaces.

In a third aspect, which may be alternative to or additional to the first and second aspects, the present invention is directed to providing a nail for fixing a shoe to a hoof which includes a predetermined variation in the microstructure of the nail to predispose the nail to bend in a desired orientation. Accordingly, this aspect of the invention has particular application to horseshoe nails with the predetermined variation in microstructure being designed to facilitate bending of the shank about the rear surface.

In one form of the third aspect of the invention, the microstructure may exhibit a predominantly uniform grain structure with the variation being in the degree of elongation of the grain structure. In another form, the microstructure may exhibit variations in the mechanical properties of the microstructure. For example, the hardness may vary in different regions of the shank. This variation in the mechanical properties of the microstructure may be due to a variation in the type of grain structure or, as in the above case wherein a predominantly uniform grain structure is provided, by a variation in the orientation or elongation of the grain structure.

Variations in the microstructure have occurred in previous horseshoe nails mainly as a result of the forming process. However, previously these variations have randomly occurred throughout the nail structure and as mentioned above, have resulted in inconsistency in the bending performance of the nail. In contrast, in the third aspect of the present invention, these variations are not random throughout the nail structure but rather are specifically incorporated to predispose the nail to bend in a desired orientation. The advantage of this arrangement is that it can improve the bending performance of the nail. Further it is considered that this improvement in performance results in part from the predetermined variation in the microstructure offsetting any random variations in the microstructure which may occur during the complex forming process.

A nail for fixing a shoe to a hoof provided in accordance with the third aspect of the invention includes a head, and a shank extending from the head along a longitudinal axis and terminating in a tip. The shank has a flattened profile having front and rear surfaces interconnected by respective edge surfaces. The shank includes a reaction region adjacent the tip and a bending region intermediate the reaction region and the head. The shank including the bending region exhibits a predetermined variation in microstructure so as to produce, on forcing the nail into a hoof, a resultant force adapted to predispose the nail to bend at the bending region about the rear surface of the shank.

In one form of the third aspect, the invention is characterised in that the variation in the microstructure occurs at the bending region with the microstructure at the region of the front surface differing from the microstructure at the region of the rear surface of the shank.

In one form, the microstructure at the bending region along a cross section normal to the longitudinal axis of the shank exhibits a predominantly uniform grain structure having a greater degree of elongation of the structure at the front surface than at the rear surface. In one form, the degree of elongation of the grain structure generally decreases from the front surface to the rear surface.

In another form, the microstructure at the above cross section is characterised by a variation in the mechanical properties of the structure between the front surface and the rear surface. In one form, the hardness of the structure in the region of the front surface is greater than the hardness in the region of the rear surface. In one form, the hardness of the structure generally decreases from the front surface to the rear surface.

In one form, the microstructure at the front surface exhibits a hardness which is in the range of 10 to 50%, more preferably 20 to 40%, greater than the hardness of the microstructure at the back surface.

The abovementioned variations in the microstructure in the shank between the front surface and the rear surface are considered to improve the bending performance of the nail. On driving the nail into a hoof, the loading acting along the axis of the shank causes the softer or more ductile portions of the shank at the rear surface to deform before the harder front surface. This deformation draws the nail to bend about the rear surface and complements the action of the resultant force acting at the reaction region. It is further considered that the harder region at the front surface provides a support for the nail shank and prevents nail collapse, which therefore assists in maintaining the nail on its optimum path as it bends through the hoof.

In another form of the third aspect, the invention is characterised in that the variation in the microstructure occurs between the reaction region and the bending region. In one form the shank exhibits a microstructure and predominantly uniform grain structure and, in a cross section along the longitudinal axis, the microstructure exhibits a greater degree of elongation of the grain structure in the reaction region than in the bending region.

In one form, in the cross section along the longitudinal axis, the variation in the microstructure is characterised by a variation in the mechanical properties of the structure. In one form, in the cross section along the longitudinal axis, the hardness in the reaction region is greater than the hardness in the bending region.

It is considered that this variation between the reaction region and the bending region improves the bending performance of the nail. The variation of the microstructure between the reaction region and the bending region makes it less likely that the reaction region will excessively bend on forcing the nail into the hoof. In this way the reaction region is better able to support the tip of the nail. As a result of the tip being better supported, it is less likely to deviate from its optimum path of travel through the hoof.

Preferably, in all three aspects of the invention thus far disclosed, at least part of the edges between the front surface and the adjacent edge surfaces of the shank are chamfered. Preferably the chamfer on each edge does not extend through the reaction region. This arrangement has the advantage that the front surface of the reaction region is not reduced by the chamfer which in turn enables the magnitude of the resultant force produced by the reaction region to be maximised.

Preferably the nail has a generally tapered appearance with the front and rear surfaces as well as the edge surfaces tapering towards the tip. Preferably, the front surface converges towards the centreline of the shank whilst the rear surface, which is substantially flat, remains parallel to the centreline. Preferably, both the edge surfaces converge towards the centreline.

Preferably the head is larger than the shank and is generally rectangular in cross section having a front and rear surface interconnected by edge surfaces, and includes a flattened top or end bearing surface. Preferably the rear surface of the head is substantially flush with the rear surface of the shank whereas the edge surfaces and the front surface diverge outwardly from the shank.

The amount of bending of the nail in use depends on the magnitude of the resultant force, the dimensions of the nail, and the strength of the material from which the nail is made. Accordingly, the dimensions of the nail, such as its thickness, length and the amount of curve on the front surface of the reaction region in the first aspect of the invention, as well as the material from which the nail is made, may vary depending on the type of hoof in which the nail is to be used as well as the amount of bend that is desired. For a particular application of the nail, these required parameters can be determined through trial and experiment by a person skilled in the art. Further, the construction of the reaction region can be incorporated, and the benefits realised, in these different nail constructions. Therefore, to gain an understanding of the invention it is not necessary to specify these parameters in any detail.

SUMMARY OF THE INVENTION—PROCESS ASPECTS

In fourth and fifth aspects of the invention, a method of forming a nail is provided. In the fourth aspect, a method of the invention is adapted to incorporate the variations in the microstructure of the nail which is the subject of the third aspect of the invention. In this fourth aspect of the invention, a nail is formed from a feed material of predominantly uniform grain structure and the desired variation in the microstructure is provided by regulating the amount of cold working the nail is subjected to during the forming process.

Accordingly, in its fourth aspect, the present invention provides a method of forming a nail for fixing a shoe to a hoof, the nail having a head, and a shank extending along a longitudinal axis from the head and terminating in a tip, the shank having a flattened profile having front and rear surfaces, and the method including the steps of:

(i) providing a nail blank formed from feed material having a predominantly uniform grain structure; and (ii) forming the flattened profile of the shank by cold working the nail blank with a front surface of the shank being subjected to a greater degree of cold working than a rear surface of the shank.

In one form, the flattened profile of the shank is formed by cold working the nail blank in a direction substantially transverse to the longitudinal axis. In one form, the nail blank is located between cooperating dies and the shank is cold worked by a pressing operation. In one form, the nail blank is located on one of the dies and, during the pressing operation, the other die is moved into engagement with the nail blank. In this arrangement, the rear surface of the shank is formed against the one die and the front surface is formed against the other die.

In one form, the sides of the nail blank interconnecting the front and rear surfaces are not constrained during the pressing operation. In this way, elongation of the nail blank in a direction outwardly from the longitudinal axis is facilitated. In one form, to increase the variation in cold working between the front and rear surfaces and to facilitate the elongation of the blank outwardly from the longitudinal axis, at least one of the cooperating dies includes a recess which extends generally parallel to the longitudinal axis of the shank. During the pressing operation, the feed tends to flow into this recess. Preferably the one die includes a pair of these recesses located on opposing sides of the blank. In this arrangement, the forming of the shank includes a further step of shearing the blank in the direction of the longitudinal axis to remove the metal which has flowed into the recesses and to form the opposing side surfaces of the shank which interconnect the front and rear surfaces.

The advantage of this arrangement is that varying the amount of cold working between the front and rear surfaces causes a corresponding variation in the microstructure. More specifically, the degree of elongation of the grain structure decreases from the front surface towards the rear surface. This results in a variation in the mechanical properties of the nail, such as its hardness.

Particular advantages are achieved by providing the recesses on the one die. It is considered that this arrangement increases the amount of variation in the cold working between the front and rear surfaces. During the pressing operation, the material is caused to flow from the contact area of the other die and moves into the recesses. This action causes additional working in the area of the nail blank contacting the other die than in the area of contact at the one die where the material remains fairly stationary. This in turn results in a greater degree of work hardening being formed at the front surface than at the rear surface.

A further advantage is that the most heavily worked sections of the blank are removed. These sections are the side parts which form in the recess. The advantage of this arrangement is that the more heavily worked areas are more likely to include flaws in the microstructure which may otherwise cause problems with the bending performance of the nail.

Also in its fourth aspect, the present invention provides a method of forming a nail for fixing a shoe to the hoof, the nail having a head, and a shank extending along a longitudinal axis from the head and terminating in a tip, the shank including a reaction region adjacent the tip and a bending region intermediate the reaction region and the head, the reaction region being shaped so as to produce, on forcing the nail into the hoof, a resultant force adapted to bias or predispose a nail to bend at the bending region in a desired orientation, the method including the steps of:

(i) providing a nail blank formed from feed material having a predominantly uniform grain structure; and (ii) forming the shank by cold working the nail blank with the reaction region being subjected to a greater degree of cold working than the bending region of the shank.

The advantage of this aspect of the invention is that varying the amount of cold working between the bending region and the reaction region of the shank causes a corresponding variation in the microstructure. More specifically, the reaction region exhibits a microstructure having a greater degree of elongation of the grain structure than the microstructure in the bending region. This results in a variation in mechanical properties, such as the hardness, between the reaction region and the bending region.

Still further in its fourth aspect, the present invention provides a method of forming a nail for fixing a shoe to a hoof, the nail having a head, and a shank extending from the head generally along a longitudinal axis and terminating in a tip, the shank of said nail having a predetermined range of hardness along the shank and the method including the steps of:

(i) providing a nail blank formed from a feed material having a hardness which is less than said predetermined range of hardness;

(ii) forming the shank by cold working the nail blank;

(iii) controlling the cold working of the blank so as to increase the hardness along said shank to within said predetermined range of hardness; and (iv) shearing said shank so as to form said tip.

The advantage of this aspect of the invention is that the hardness in the shank is controlled in the forming process. The expected increased in hardness in cold working the nail blank is factored in by preferably choosing a wire feed having a hardness which is significantly less than the final desired range of hardness, and by controlling the cold working of the shank so that the increase in hardness caused by this process step equals the amount required to attain the desired hardness at a particular point on the shank. In one form, the hardness of the shank varies along the length of the shank and, preferably, the hardness of the tip region is greater than other parts of the shank. In one form, the hardness of the shank varies between the front and back surfaces, and in particular the hardness decreases from the front surface to the rear surface. In one form of the invention, the variation in hardness is achieved by varying the degree of cold working along the shank.

This fourth aspect of the invention provides significant advantages. In previous methods of forming horseshoe nails, the nail is required to undergo an annealing step before final forming of the nail to reduce the work hardening which has occurred in the earlier stages of nail formation. By incorporating the annealing step in this previous nail formation process, the control of the microstructure of the nail is diminished as the annealing step can result in irregular grain structure forming within the microstructure. An advantage of the fourth aspect of the invention is that by creating a situation where this annealing step is not required, the microstructure of the nail is further controlled. Furthermore, variations in the microstructure may be arranged to be incorporated in the forming process. In particular, it is possible to design a nail formed from a predominantly uniform feed material which exhibits a variation in the amount of elongation of the grain structure so as to exhibit a variation in hardness at different regions along the shank. In particular, it is possible to provide a nail which exhibits a variation in hardness between the front and rear surfaces and a variation in hardness between the bending region and the reaction region. This variation in hardness is considered ideal. In addition, the forming operation is simplified.

In one form, the reaction region is subjected to a higher degree of cold working as compared to the other parts of the shank. This gives the reaction region a higher degree of grain elongation and hardness. While the additional cold working may produce local variation in the microstructure of the tip region of the shank, this variation does not cause the nail to bend inconsistently as the majority of the bending occurs in the bending region of the shank. In contrast as mentioned above, it is considered that this variation improves the bending performance as the increase in the hardness of the reaction region further supports the tip of the nail.

Preferably after cold working the reaction region, the nail undergoes a shearing step to form the tip. In one form this shearing step also forms the opposing edges of the reaction region. In one form, the reaction region is formed with the front surface incorporating the angled portion being generally curved and the opposing edge surfaces being convexly curved and being arranged to converge relative to each other towards the tip.

In one form, the feed material is wire. In one form, the wire feed has been produced using a suitable heat treatment process resulting in the formation of a predominantly uniform, equiaxed or elongated, ferrite structure. The form of the carbide present in the structure may be either spheroidal or lamellar. The hardness of the wire feed prior to the initial cold working operation is preferably less than 200 HV30.

The wire production process can involve a skin or sizing pass following the heat treatment operation and prior to the formation of the nail blank. The use of a suitably heat treated wire feed is preferred over other types of feed such as non heat treated drawn wire feed as the microstructure and hardness of a heat treated wire is more consistent, thereby promoting a more uniform response to subsequent cold working operations.

Preferably, and according to a fifth aspect of the invention, the nail is formed by a method including the steps of:

(i) providing wire of a cross section of similar area to the subsequent shank;

(ii) upsetting an end of the wire to form the head; and (iii) working a nail blank cut from the wire and including the head, substantially without drawing the blank, to form the flattened profile of the shank, and forming the tip on the flattened shank.

In this way, the conventional practice in horseshoe nail manufacture of utilising a wire blank of gauge similar to the head, and the consequent drawing operation, are avoided. In turn, the lack of drawing allows the annealing steps to be omitted, with consequent enhanced hardness at the tip, as well as the economic advantage of a simpler formation process.

The arrangement of the fifth aspect of the invention is also preferred as the upsetting operation increases the hardness of the shank adjacent the head. This is beneficial as this area of the shank is under heavy loading in use and is prone to wear because it rubs against the horseshoe. Furthermore as this region of the shank does not bend, the increase in hardness does not effect the bending performance of the nail.

A further aspect of the invention provides a nail for fixing a shoe to a hoof which is formed by a method of any of the forms of the invention.

BRIEF DESCRIPTION OF THE DRAWINGS

The invention will be further described by way of example only, with reference to the accompanying drawings, in which:

FIG. 1 is an enlarged perspective view of a horseshoe nail according to a first embodiment of the invention, incorporating preferred features of the first, second and third aspects of the invention and made by preferred steps of the fourth and fifth aspects of the invention;

FIGS. 2 to 4 are correspondingly enlarged plan, underneath and side elevation views respectively of the nail shown in FIG. 1;

FIGS. 5 to 8 are schematic views of successive operations of an apparatus for forming a head on a nail blank to be further formed into a nail such as that shown in FIGS. 1 to 4;

FIGS. 10 to 16 are respective views to an enlarged scale of nail blanks formed at different stages of the apparatus of FIG. 9;

FIGS. 17 to 19 are schematic cross sections illustrating how the horseshoe nail bends as it is driven through a horse's hoof.

DESCRIPTION OF PREFERRED EMBODIMENTS

Figure 9:
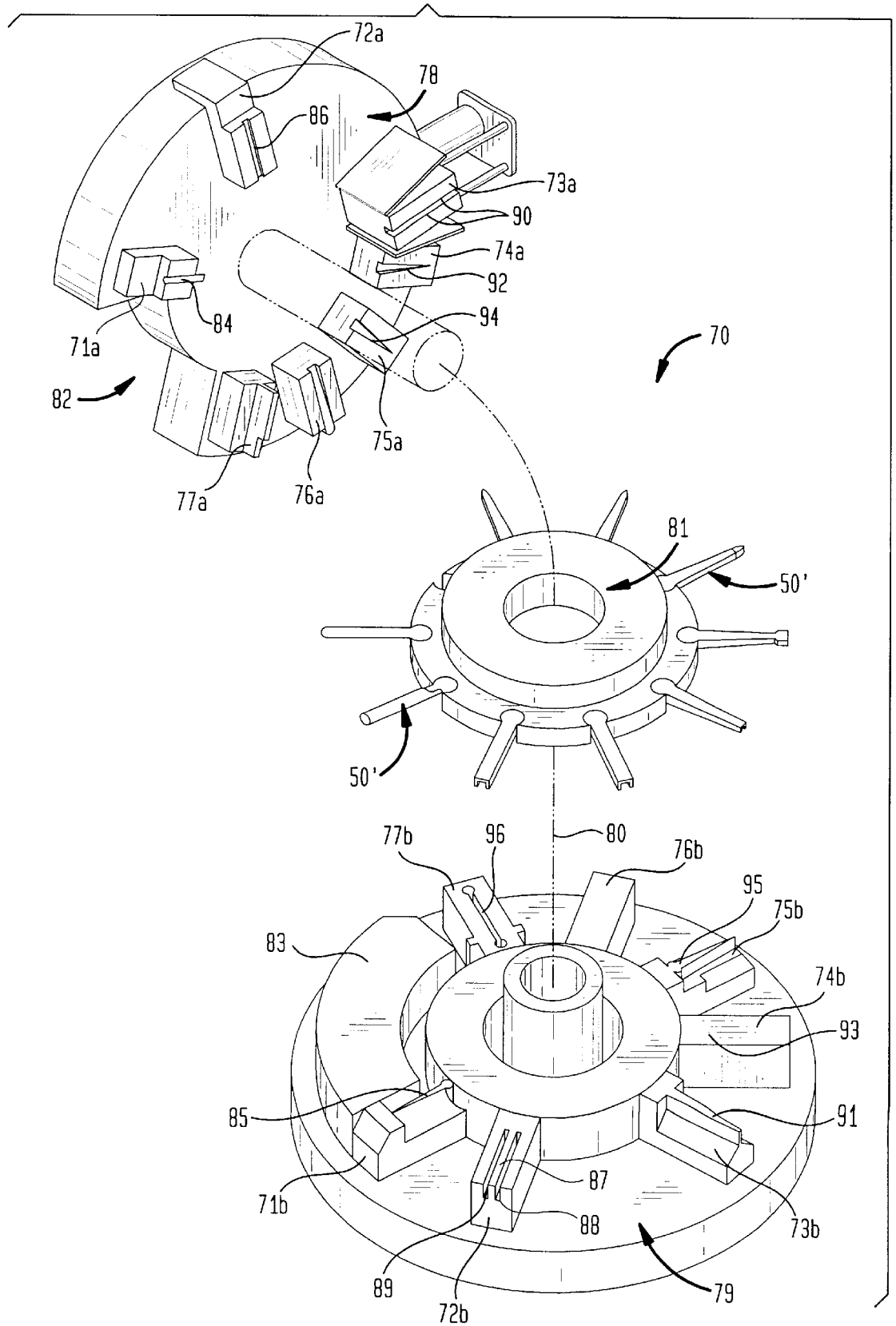
FIG. 9 is an exploded perspective view of an apparatus for forming horseshoe nails from headed blanks produced by the apparatus depicted in FIGS. 5 to 8.

The horseshoe nail 10 illustrated in FIGS. 1 to 4 is formed from fully annealed steel wire having a predominantly uniform grain structure, such as that sold by The Broken Hill Proprietary Company Limited (BIP) under the trade name SOFI DRAWN XU1004, by the method to be described below with reference to FIGS. 5 to 16. Nail 10 has a head 11 and a shank 12 extending from the head and terminating in a tip 13.

The nail 10 has a generally rectangular cross section relative to a centreline or longitudinal axis 14 extending along the shank 12, with a front surface 15 and a rear surface 16 interconnected by opposing edge surfaces 17,18. The head 11 is larger than the shank and has a rear surface 19 which is substantially flush with the rear surface 16 of the shank, a front surface 20, and opposing edge surfaces 22, which diverge outwardly from the shank 12. A flat bearing surface 23 is formed at the top or end of the head 11.

The nail has a generally tapered appearance, with the front and rear surfaces 15,16 of the shank, as well as the edge surfaces 17,18, tapering towards the tip. The front surface 15 converges towards the centreline 14 of the shank whilst the rear surface 16, which is substantially flat, remains parallel to the centreline 14. Both the edge surfaces 17,18 of the shank converge towards the centreline.

A reaction region 24 is formed in the shank 12 adjacent the tip 13. The region has a front surface 25, a rear surface 26 and opposing edge surfaces 27,28 each of which is a continuation of a corresponding surface of the shank. The front surface 25 and the opposing edge surfaces 27,28 are arcuate and convexly curve relative to the centreline 14 to the tip 13. The rear surface 26 is substantially flat and remains generally parallel to the centreline 14.

Respective chamfers 29,30 are formed on the corner edges between the front surface 15 and the adjacent edge surfaces 17,18. The chamfer on each edge extends along the majority of the shank 12 but does not extend through the reaction region 24. Shoulders 31,32 are formed at the termination of the chamfers 29,30 adjacent the reaction region 24.

Nail 19 is formed from wire of a cross section of similar area to the cross section of shank 12, and length slightly greater than the length of the final nail. The first step is to upset an end of the wire to form the head and so form the segment into a nail blank. A suitable apparatus 40 for forming such nail blanks is schematically illustrated in FIGS. 5 to 8.

The apparatus 40 includes a clamp 41 and hammer 42. The wire is firstly cut and placed into the clamp 41 (FIG. 5). The clamp 41 includes a recess 43 in an upper surface 44 which is adapted to cooperate with the hammer 42. The cut wire feed 50 is clamped with an end region 51 projecting from the upper surface 44.

The hammer 42 includes a plunger 47 in a bore 47a which widens into a recess 45 in lower surface 46, and is adapted to engage the clamp 41 so that the end region 51 of the wire feed 50 is received through recess 45 into bore 47a, with the recesses 43,45 in register (FIG. 6).

To carry out the upsetting operation, which forms a head 52 on the wire feed 50, plunger 47 of the hammer 42 is driven onto the end of the wire feed 50 as illustrated in FIG. 8, causing the end region 51 of the wire feed to flow into recesses 43,45 and form a head 52 which is substantially spherical. The wire feed is now cut and a headed nail blank 50' (FIG. 10) is recovered from the head forming apparatus. There may or may not be a residual tail 50a. These nail blanks 50' are delivered for further processing to the forming apparatus 60 illustrated in FIG. 9.

Forming apparatus 70 includes a plurality of cooperating dies (71a, 71b, 72a, 72b, 73a, 73b, 74a, 74b, 75a, 75b, 76a, 76b, 77a, 77b). The dies are arranged in pairs, with a respective one of each pair being located in an upper annual die block 78 and the other die of each pair being located in a matching annular lower die block 79. The die blocks are operable under a hydraulic ram (not shown) with the dies being arranged in a circular array around a central axis 80. However, it is to be understood that the respective pairs of dies could be configured and operable under a different arrangement. In particular the dies could be aligned in a linear or other non-circular array and each or some of respective pairs of dies could be operable under a separate drive arrangement.

In the illustrated arrangement, an annular nail blank carriage 81, is located between the upper and lower die blocks (78,79) and is moveable about the central axis 80 of the forming apparatus 70. The carriage 81 retains nail blanks 50' and is operable on release of pressure from the respective die blocks to move each nail blank through each of the respective pairs of dies to enable the nail blanks 50' to be formed by each of the respective dies.

The apparatus 70 further includes a feed arrangement to enable the nail blanks 50' to be fed onto the nail blank carriage 81. The feed arrangement is not shown in the illustration but is adapted to feed nails through an arcuate recess 82 in the upper die block 78. The blanks are delivered from the feed arrangement onto an upstanding plate or land 83 located on the lower die block and which is adapted to be aligned with the nail blank carriage 81.

With reference to FIG. 9 and to FIGS. 10 to 16, each nail blank 50' undergoes six forming steps within the forming apparatus 70 under the various cooperating dies.

In a first step, the nail blank 50' (FIG. 10) is brought between dies 71a,71b. These dies are adapted to cold work the nail blank 50' to shape the head 52 and the top of the shank 53. The top die 71a includes a recess 84 in which the nail blank 50' is located. An elongate projection 85 on the bottom die 71b is adapted to engage the opposing side of the nail blank 50'. On cooperation of the dies, the nail blank 50' is cold worked to shape the head 52 such that it has a pentagonal section of tapered thickness, and to also shape the top part of the shank 53 into a generally rectangular section 53a (FIG. 11).

The second step is when the nail blank 50' is brought between dies 72a,72b. This step is adapted to commence forming the balance of the shank 53, by flattening the shank 53. The upper die 72a incorporates a tapered channel 86 which is adapted to receive the nail blank 50'. The lower die 72b includes a central support 87 bordered by a pair of channels 88,89. The opposing side of the nail blank 50' is supported on this central support 87. On cooperation of the dies, the balance of the shank 53 is flattened with excess material flowing into the recesses 88,89. This gives the shank 53 a channelled profile (FIG. 12) having a web 54 extending between opposing flanges 55,56 which tapers in thickness from the base of the head to the end of the shank. This process of material flow into the recesses causes the area 61 of the nail blank in contact with upper die 72*a* to be cold worked to a greater extent than the area 62 of the nail blank in contact with the lower die 72*b*. It is believed that this difference is due to the significantly greater material flow around the outside of the U-shape into recesses 88,89 than on the inside against the lower die. The outcome in the final nail is a variation of cold working between the front surface 15 and the rear surface 16 of the finished nail.

In the next step, the major part of the shank 53 is shaped by a shearing operation which removes the flanges 55 and 56 to leave the web 54. In this step, the nail blank 50' is brought into engagement with the dies 73*a*,73*b*. Shearing blades 90 form the top die 73*a* which are cooperable with opposing edges of a support plate 91 formed on the bottom die 73*b*. During this shearing step, the flanges 55 and 56 are removed with opposing sides 57 and 58 of the shank 53 being formed at the shear line. The shank 53 is sheared such that it tapers in width from the tip towards the head (FIG. 13).

The next step is a further cold working step which commences formation of the reaction region 24 adjacent tip 13 of the nail 10 and further works the major part of the shank. In this step, the nail blank is located between the dies 74*a*,74*b*. The upper die 74*a* includes a recess 92 in which the shank 53 is located. The lower die 74*b* includes a plate 93. In this step, the tip region of the blank 50' is heavily cold worked to form the reaction region 59 in the shank 53 with the front surface 61*a* of the shank at the reaction region 59 being convexly curved (FIG. 14). The rear surface 62 of the shank remains substantially flat. Chamfers 63 and 64 are pressed into the shank 53 on the front surface 61 to facilitate passage of the nail 10 through a hoof. This step of the forming process causes the reaction region to be harder than the remaining shank.

The next step is a further shearing step where the formation of the reaction region 24 and tip 13 is completed. In this step, the blank 50' is located between dies 75*a*,75*b*. Similar to dies 73*a*,73*b*, the upper die 75*a* includes shearing blades 94 which cooperate with opposing edges of a support plate 95 located on the lower die 75*b*. In this step, the opposing edge surfaces 27,28 of the reaction region 24/59 are formed. In the illustrated form, the shearing blades 94 and support plate 95 are adapted to shear along an arcuate line such that the reaction region edge surfaces 27,28 are convexly curved and merge towards the tip 13 of the blank 50' (FIG. 15).

The final forming step (FIG. 16) is to correct the flatness of the rear surface of the shank and stamp a marking 67 into the head. This is achieved by cooperation of the dies 76*a*,76*b*.

The formed nail 10 is then located between dies 77*a*,77*b*, which are cooperable to force the nail out of the nail carriage 81. The nail 10 passes into a recess 96 which is formed on the lower die 77*b*, wherein it passes out from the apparatus 70. Once the nails 10 are ejected from the apparatus 70, they can if required be rumbled to improve their surface finish.

The benefits of this method of nail formation described above is that the increase in hardness of the nail can be controlled throughout the forming operation by controlling the amount of cold working the nail is subjected to. Furthermore the nail is able to exhibit a predetermined variation in the microstructure by varying the amount of cold working in different regions of the shank. By controlling these aspects of the microstructure of the nail, an improved horseshoe nail is able to be formed which is able to bend more consistently than previous horseshoe nails.

However it is to be realised that the amount of bending of the nail in use depends on the magnitude of the resultant force on the nail, the dimensions of the nail, and the strength and material from which the nail is made. Accordingly, the dimensions of the nail, such as its thickness, length and the amount of curve on the front surface of the reaction region, as well as the material from which the nail is made, may vary depending on the type of hoof in which the nail is to be used as well as the amount of bend that is desired. For a particular application of the nail, these parameters will vary. However, the features of the nail and the forming process described above can be incorporated, and the benefits realised, in these different nail constructions.

The nail 10 is adapted to be hammered into a horse's hoof. The chamfered edges 29,30, are adapted to facilitate passage of the nail through the hoof and reaction region 24 is adapted to produce a resultant force on the nail caused by engagement of the reaction region with the hoof, which biases or predisposes the bending region 33 of the nail to bend about the rear surface 16. The variation in the microstructure of the nail assists this process with the variation between the front and rear surfaces being adapted to complement the resultant force acting at the reaction region, and the variation between the reaction region and the bending region assisting in supporting the tip. This operation is illustrated in FIGS. 17 to 19.

As illustrated in FIG. 17, the nail 10 is adapted to be hammered through the shoe 110 into the hoof 100 with the centreline 14 of the nail being initially substantially parallel to the respective side face 102 of the hoof. The nail is positioned through the pre-made slot 111 in the shoe, with the rear surface 16 facing outwardly. As the nail is hammered into the centre of the wall or nail 105 of the hoof, and therefore initially midway between the interior 106 and the outer side surface 102, a loading is imparted to the front surface 25 of the interior of the reaction region 24. As this surface 25 is inclined to the centreline 14 of the shank, it imparts a biasing force onto the nail, which biases the nail about the rear surface 16. Predisposal to bend about surface 16 in a consistent and predictable manner is further enhanced by the convex curvature of surface 25. Furthermore, the loading on the nail which extends along the shank causes the softer or more ductile portions of the shank at the rear surface 16 to deform before the harder front surface 15. This deformation draws the nail to bend about the rear surface 16 and complement the action of the biasing force acting at the front surface 25 of the reaction region 24 (FIG. 18).

The edge surfaces 27,28 of the reaction region 24 are convexly curved and support the tip 13 and guide the tip 13 through the hoof as the nail bends about the rear surface 16. As the reaction region is harder than the bending region, the tip 13 remains well supported. Furthermore the harder region at the front surface of the nail shank assists in maintaining the nail on its optimum path as it bends through the wall 105 of the hoof, as it prevents the, nail collapsing or deflecting from this optimum path. As the nail curves into the harder outer zone of wall 105, the radius of curvature increases. On fully driving the nail into the hoof the tip 13 exits the side face 102 of the hoof (FIG. 19). Once in this position, the tip 13 is removed and the remaining shank is driven downwardly against the side face of the hoof which secures the nail, and therefore the shoe, in place. It is found that the nail of the embodiment also exits at an angle within a confined range, e.g. 30° to 400 to side face 102, which is preferred for bending over.

Consequently, the nail 10 is predisposed to bend about the rear surface of the shank,. due to the shape of the nail as well as the variation within the microstructure. With this arrangement, the nail is less likely than the prior art horseshoe nails to deviate from its desired curved path on driving the nail into the hoof. Further the shape and hardness of the reaction region with the arcuate front and opposing edge surfaces provide a more sturdy arrangement than prior art horseshoe nails and is less likely to be affected by impact loading which may occur during manufacture or transportation of the nails.

Figure 20:
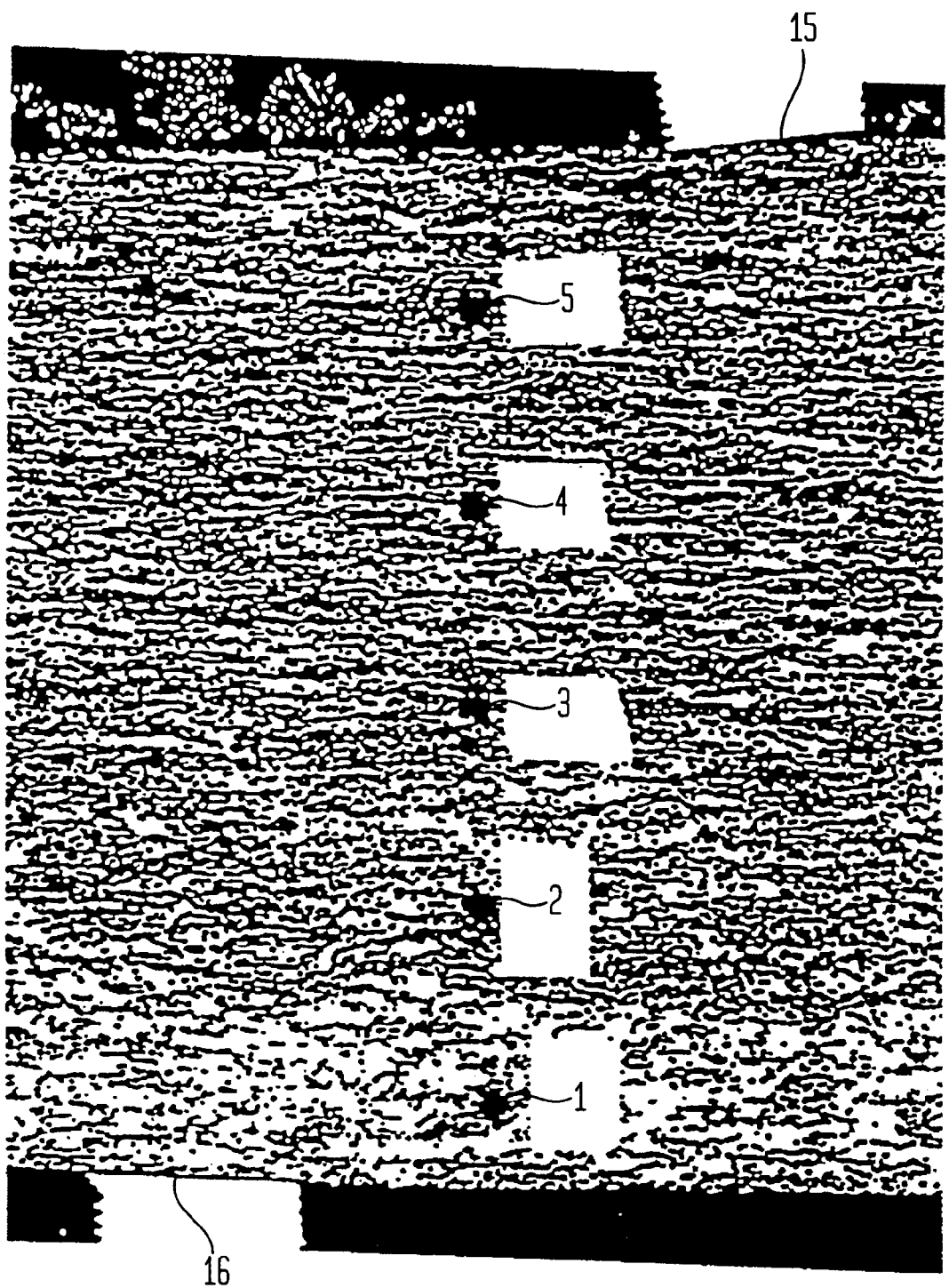
FIG. 20 is a photomicrograph of a cross section of the nail depicted in FIGS. 1 to 4, approximately on the line X—X in FIG. 3, and produced by the apparatus of FIG. 9.

An example of a horseshoe nail formed by the above method is described below and a cross section depicting its microstructure is shown in FIG. 20.

EXAMPLE

The feed material was an aluminium killed heat treated wire sold by BHP under the trade name SOFT DRAWN XU1004. The wire had a tensile strength of approximately 350 MPa and a diameter of 3.55 mm. The hardness of the feed wire was approximately 120 HV30. The composition of the wire was as follows:

| C | P | Mn | Si | S | Cu | N | Ni | Al |
|---|---|---|---|---|---|---|---|---|
| 0.06* | 0.25* | 0.25/0.40 | 0.05* | 0.025* | 0.05* | 0.008* | — | 0.025 |

*indicates maximum value.

Following the initial upsetting operation, the nail blank had a spherical head of approximately 5.2 mm in diameter and 4.3 mm in thickness. The length of the headed blank was 47 mm.

On cold forming the head and the top of the shank under operation of dies 71a,71b, the dimensions of the nail blank were as follows:

Head thickness—top 4.7 mm;
Shank—3 mm;
Head width, widest point 6.8 mm—top 4.5 mm—shank 3.8 mm;
The head height 5.9 mm—shank thickness 2.5 mm at base of head tapering to 2.1 mm adjacent to the original wire section;
Formed shank length 7 mm;
Total length of the headed blank 48 mm.

On flattening the remainder of the original wire section under operation of dies 72a,72b, the web of the shank was tapered in thickness from 3 mm at the base of the head to 1 mm at the end of the shank. The total length of the headed blank was 49 mm.

On shearing the shank under operation of the dies 73a, 73b, the thickness of the shank was unchanged and the width of the shank tapered from 3.8 mm at the base of the head to 2 mm at the tip of the blank. The total length of the headed blank was 49 mm.

In the formation of the reaction region under operation of dies 74a,74b, the reaction region extended over 7 mm, with the thickness of the shank at the reaction region being reduced from 1 mm to 0.7 mm. The length of the total headed blank remained at 49 mm.

On shearing of the reaction region under operation of dies 75a,75b, the reaction region was tapered over the 7 mm length from the tip with the maximum width of the reaction region at the top being 2.4 mm. The total length of the headed blank was 48 mm.

On flattening of the nail under operation of dies 76a,76b, the total length of the headed blank was extended to 49 mm.

Table 1 indicates the hardness along a longitudinal cross section of nail blanks after various stages of the forming operation.

Table 2 indicates the hardness of the finished nail at the bending region with tests being taken along a longitudinal cross section at points between the front surface and the rear surface.

Table 3 indicates the hardness of the finished nail at the reaction region with tests being taken along a longitudinal cross section at points midway between the front and rear surfaces.

FIG. 20 is a photomicrograph of a representative cross section of the bending region of the finished nail, taken at approximately the line X—X in FIG. 3. The photomicrograph illustrates the variation in the elongation of the grain structure between the front surface 15 and rear surface 16. As clearly illustrated, the grain structure in the region of the rear surface is quite equiaxed but becomes more elongated towards the front surface. One of the hardness traverses detailed in Table 2 is also illustrated with the references to five test points illustrated corresponding to the references given in this table.

TABLE I

Hardness Test Results (HV30)

| | Head- | | Position-Shank | | Bending Region |
|---|---|---|---|---|---|
| Section | 1 | 2 | 3 | 4 | 5 |
| Original nail blank | 164 | 202 | 124 | 118 | |
| After Operation of Dies 11a, 11b | 216 | 159 | 177 | 118 | |
| After Operation of Dies 12a, 12b | 227 | 163 | 191 | 191 | |
| After Operation of Dies 13a, 13b | 216 | 156 | 172 | 147 | |
| After Operation of Dies 14a, 14b | 217 | 152 | 191 | 197 | 206 |
| After Operation of Dies 15a, 15b | 215 | 151 | 189 | 189 | 209 |
| After Operation of Dies 16a, 16b | 193 | 164 | 181 | 201 | 207 |

TABLE 2

Micro Hardness Test Results (MHV)

| | Rear Surface | | Position-Bending Region | | Front Surface |
|---|---|---|---|---|---|
| Traverse | 1 | 2 | 3 | 4 | 5 |
| 1 | 165.1 | 189.3 | 194.8 | 226.4 | 208.5 |
| 2 | 164.3 | 170.9 | 211.6 | 210.6 | 215.3 |
| 3 | 162.0 | 177.9 | 188.3 | 217.8 | 208.8 |
| 4 | 160.4 | 189.9 | 203.6 | 204.6 | 221.9 |

Test Conditions
Peak force   150 p
Dwell Time   15 seconds
Slope   20 p/s

TABLE 3

Micro Hardness Results (MHV)

| Tip End | Position - Reaction Region | Bending Region End |
|---|---|---|
| 1 | 2 | 3 |
| 241 | 234 | 225 |

Test Conditions
Peak force   150 p
Dwell Time   15 seconds
Slope   20 p/s

I claim:

1. A nail for fixing a shoe to a hoof, the nail including a head, and a shank extending from the head along a longitudinal axis and terminating in a tip, the shank having a flattened profile having spaced front and rear surfaces interconnected by respective edge surfaces, wherein the shank includes a reaction region adjacent the tip and a bending region intermediate the reaction region and the head, and wherein the shank at the bending region exhibits a predetermined variation in microstructure with the microstructure at the region of the front surface differing from the microstructure at the region of the rear surface of the shank, so as to produce, on forcing the nail into a hoof, a resultant force adapted to predispose the nail to bend at the bending region about the rear surface of the shank.

2. A nail according to claim 1 wherein the microstructure at the bending region along a cross section normal to the centreline or longitudinal axis of the shank exhibits a predominately uniform grain structure having a greater degree of elongation of the structure at the front surface than at the rear surface.

3. A nail according to claim 1 wherein the microstructure along a cross section normal to the centreline or longitudinal axis of the shank is characterised by a variation in the mechanical properties of the structure between the front surface and the rear surface.

4. A nail according to claim 3 wherein the hardness of the structure in the region of the front surface is greater than the hardness in the region of the rear surface.

5. A nail according to claim 4 wherein the microstructure at the front surface exhibits; a hardness which is in the range of 10 to 50% greater than the hardness of the microstructure at the rear surface.

6. A nail according to claim 1 wherein at least part of respective edges between the front surface and the adjacent edge surfaces of the shank are chamfered.

7. A nail according to claim 6 wherein the chamfer on each edge does not extend through the reaction region.

8. A nail according to claim 1 wherein the nail has a generally tapered appearance with the front and rear surfaces as well as the edge surfaces tapering towards the tip.

9. A nail according to claim 8 wherein the front surface converges towards the centreline or longitudinal axis of the shank, the rear surface, which is substantially flat, remains parallel to the centreline or axis, and both the edge surfaces converge towards the centreline or axis.

10. A nail according to claim 1 wherein the head is larger than the shank and is generally rectangular in cross section having a front and rear surface interconnected by edge surfaces, and includes a flattened top or end bearing surface.

11. A nail according to claim 1, wherein, in the reaction region, the front surface is convexly curved to incline the front surface relative to the longitudinal axis of the shank, and the edge surfaces converge relative to each other towards the tip, whereby, on forcing the nail into the hoof, the reaction region is adapted to produce a resultant force on the nail caused by engagement of the reaction region with the hoof, the resultant force being adapted to further predispose the nail to bend about the rear surface of the reaction region.

12. A nail according to claim 11, wherein the reaction region merges with the remaining part of the shank such that the flattened profile extends towards the head.

13. A nail according to claim 1, wherein, in the reaction region, the edge surfaces are convexly curved towards the tip so as to converge towards the tip, and the front surface is inclined relative to the centreline or longitudinal axis of the shank.

14. A nail according to claim 13, wherein the reaction region merges with the remaining part of the shank such that the flattened profile extends towards the head.

15. A nail according to claim 13, wherein said front surface is convexly curved, whereby, on forcing the nail into the hoof, the reaction region is adapted to produce a resultant force on the nail caused by engagement of the reaction region with the hoof, the resultant force being adapted to further predispose the nail to bend about the rear surface of the reaction region.

16. A nail according to claim 15, wherein the reaction region merges with the remaining part of the shank such that the flattened profile extends towards the head.

17. A method of forming a nail for fixing a shoe to a hoof, the nail having a head, and a shank extending along a longitudinal axes from the head and terminating in a tip, the shank having a flattened profile having front and rear surfaces, and the method including the steps of:
  (i) providing a nail blank formed from feed material having a predominately uniform grain structure;
  (ii) locating the nail blank between cooperating dies at least one of which has a recess extending generally parallel to the longitudinal axis of the shank;
  (iii) forming the flattened profile of the shank by cold working the nail blank in a direction substantially transverse to the longitudinal axis, with a front surface of the shank being subjected to a greater degree of cold working than a rear surface of the shank, wherein said cold working is effected by a pressing operation with the dies such that during the pressing, operation, metal tends to flow into said recess; and
  (iv) shearing the blank in the direction of the longitudinal axis to remove the metal which has flowed into the recess and to form the opposing side surfaces of the shank which interconnect the front and rear surfaces.

18. A method according to claim 17 wherein the sides of the nail blank interconnecting the front and rear surfaces are not constrained during the pressing operation.

19. A method according to claim 17 wherein said recess is one of a pair of recesses located on opposing sides of the blank.

20. A method according to claim 17 wherein the feed material is wire.

21. A method according to claim 20 including:
  (i) providing wire of a cross section of similar area to the subsequent shank;
  (ii) upsetting an end of the wire to form the head; and
  (iii) working a nail blank cut from the wire and including the head, substantially without drawing the blank, to form the flattened profile of the shank, and forming the tip on the flattened shank.

* * * * *